July 26, 1949.  C. L. MILTON, JR., ET AL  2,476,993
PROCESS FOR MAKING MOLDS
Filed Feb. 2, 1948
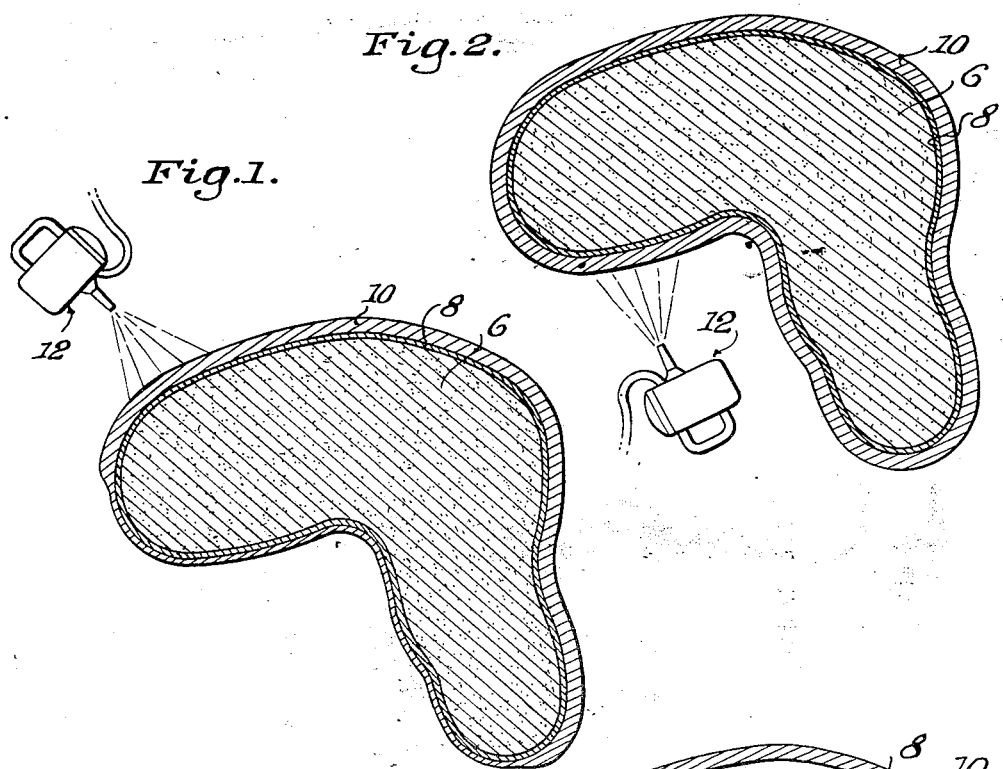
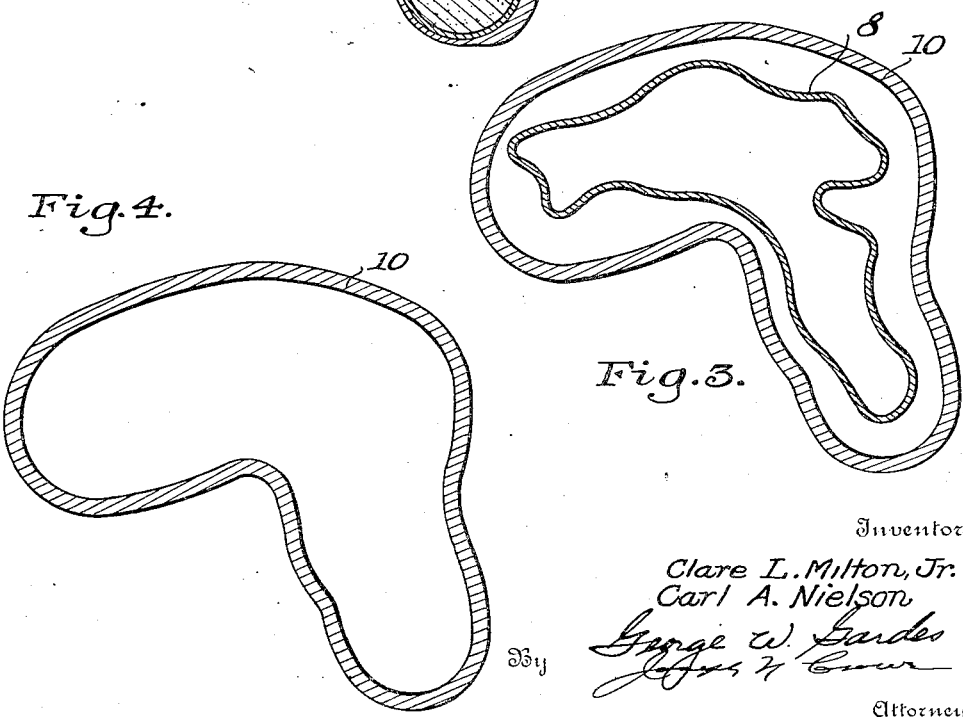
Inventors
Clare L. Milton, Jr.
Carl A. Nielson
Attorneys Patented July 26, 1949

2,476,993

UNITED STATES PATENT OFFICE 2,476,993

PROCESS FOR MAKING MOLDS

Clare L. Milton, Jr., Akron, Ohio, and Carl A. Nielson, Takoma Park, Md., assignors to the United States of America as represented by the Secretary of the Army Application February 2, 1948, Serial No. 5,710

1 Claim. (Cl. 22—190)

(Granted under the act of March 3, 1883, as amended April 30, 1928; 370 O. G. 757)

The invention described herein may be manufactured and used by or for the Government for governmental purposes, without payment to us of any royalty thereon.

The present invention relates to the construction of metal molds to be employed in molding replicas of a given object or article.

It frequently is desirable to construct a metal mold for fabricating a limited number of molded pieces when the cost of a machined mold is prohibitive and a permanent mold is unnecessary. For this purpose it often suffices to use a mold of a relatively low melting material such as tin, the melting point of which is approximately 232° C., although the process of the present invention is not limited to the use of such metals nor to the construction of temporary molds alone.

When the mold desired is severely undercut with respect to the molding, it often is not possible to construct a satisfactory sprayed mold, because a sprayed mold cannot be removed from a rigid model without suffering excessive distortion nor can such mold be sprayed successfully onto a non-rigid model.

The present invention consists of a rigid, yet potentially collapsible, model and the process of constructing a mold by spraying thereupon. The invention includes a hollow, open, flexible model fitted, at the time of spraying, with a removable rigid core. After removal of the core, the collapsible model readily can be removed from the mold sprayed around it.

For example, the process of the present invention can be used in the preparation of a temporary mold for a glove to cover a mechanical hand.

As a flexible, hollow model it is preferred to employ one produced by heating a dispersion of polyvinyl chloride or a copolymer of vinyl chloride with vinyl-acetate, methyl or ethyl acrylate, methacrylate, fumarate, or maleate, vinylidene chloride or other monomers, the said polymer or copolymer containing at least thirty-five percent chlorine, in a solution containing 0.5 to 5.0 percent by weight of a polymer or copolymer selected from the group above or a polymer of one of the monomers listed above, the balance of the solution being made up of a plasticizer for the chloride containing resin. While that is a preferred composition, use also can be made of hollow rubber models or those of compositions similar to the above, in which the chlorine containing resin is dispersed in a plasticizer or a mixture of plasticizers alone, rather than in a solution of a polymer in such a plasticizer.

Examples of suitable compositions are as follows, the amounts being parts by weight:

Example I

| | Parts |
|---|---|
| VYNU-1 (ground) | 40 |
| Di-2-ethylhexyl phthalate | 29 |
| Tricresyl phosphate | 29 |
| Polyethyl methacrylate | 2 |

Example II

| | Parts |
|---|---|
| Geon 100 x 210 | 45 |
| Di-2-ethylhexyl phthalate | 26–7 |
| Tricresyl phosphate | 26–7 |
| VYDR | 1–5 |

In the above examples, VYNU-1 and VYDR are vinyl chloride copolymer resins manufactured by the Carbide and Carbon Chemicals Company, New York, N. Y., while Geon 100 x 210 is a vinyl chloride resin produced by the B. F. Goodrich Chemical Company, Cleveland, Ohio.

The process also may be carried out over a hollow, flexible model composed of an acrylate or acrylate-methacrylate mixture but the vinyl chloride polymer compositions are preferred for their ease of handling, durability, and resistance to chemicals employed in electroplating.

As a matrix, there is preferred a mixture of sand and wax, although wax alone, or wax-clay or oil-clay mixtures, as well as various other compositions, may be used for the purpose of this invention. The sand-wax mixture is preferred, however, because it possesses the advantages that it does not shrink appreciably on cooling, that it retains its shape when the model is immersed in boiling water or a boiling solution of dilute alkali, and, when warm, it permits repositioning of the model if that be necessary. For example, when a flexible, hollow model of a human hand is filled with a mixture of sand and wax and heated, the fingers may be placed in whatever position is regarded as most desirable, and on cooling, this position is retained in the now rigid model. In spite of this highly desirable plastic property, the mixture of sand and wax can be washed out readily with hot water. It is desirable, for successful spraying, that the model be substantially rigid during the period of spraying.

As a core or filling to hold the flexible, hollow model rigid during the spraying operation, several other materials can be employed. Waxes which melt below the yield point of the pattern metal have been employed successfully.

The invention will be understood more readily by reference to the accompanying drawings wherein:

Figure 1 represents a diagrammatic, transverse, sectional elevation through a wax-filled flexible model, the view showing the model being coated by spraying;

Fig. 2 represents a transverse, sectional elevation showing the completely sprayed form;

Fig. 3 represents the practically collapsed flexible model ready to be removed from the mold;

Fig. 4 is a diagrammatic, sectional elevation showing a completed mold.

Referring more particularly to the drawings, reference numeral 6 represents a core of a wax-composition of the above-indicated characteristics, which case fills an open, collapsible model 8, that is being coated with mold metal 10. This metal is sprayed over the outside of the model 8 from any type of commercial spray gun 12. The metal 10, having a substantially higher melting point than the core 6, is applied as a finely divided spray or mist and the coating 10 is built up sufficiently slowly so that the heat of the molten metal is dissipated so rapidly that the envelope 8 and core 6 thereof do not become excessively heated, and the core 6, although made of wax, is not heated during the coating to a temperature that softens the core. The spraying is continued until a coating of requisite thickness is obtained. Since the metal being sprayed is in a very finely divided state, the interior of the resulting coating duplicates in high-fidelity character all of the surface lines and characteristics of the model 8.

When the requisite thickness of coating has been built up, the wax core 6 is removed by melting and the molten wax is flowed out from the opening in the flexible model 8. The model then may be collapsed as indicated in Fig. 3, so that it can be removed from the deposited coating. When the flexible model 8 is pulled through the opening in the coating, the coating 10 becomes a hollow metal mold adapted for use in casting replicas of a given object of which the flexible model 8 is an accurate representative.

For example, where it is desired to produce cosmetic gloves for covering artificial hands, a negative impression of a model hand is first obtained, and the flexible model described above can be cast in the impression by gelling a resinous composition of the above-indicated character. The resulting model is removed from the impression, filled with the wax composition for rendering the composition rigid, and the metal sprayed thereon as described above to produce a mold for use in casting or molding final resinous compositions for producing the finished gloves.

It will be understood, however, that the process of the invention is not limited to such adaptation, but that various shapes may be produced, depending on the shape and surface characteristics of the model.

Through the use of the process of the present invention, it is possible to construct, very cheaply, temporary metal molds which formerly would have been prohibitively expensive. However, it will be apparent that the process is not limited to the production of temporary molds as a variety of very wear-resistant metals can be deposited by spraying, using any one of several spray guns and processes in commercial use. However, sprayed deposits are usually somewhat weaker and somewhat more porous than either cast metal or electrodeposited metal, and therefore spraying is recommended especially for molds of temporary character.

Having thus described our invention, what we claim as new and wish to secure by Letters Patent is:

A process for producing metal molds for producing molded replicas of an original object, which comprises forming an open, seamless negative impression of the object duplicating on the inner surfaces of the impression, in high fidelity, all surface characteristics of the object, casting in the impression a flexible, hollow, open, seamless, positive replica of the object duplicating on its exterior surfaces all surface characteristics of the original object, removing the positive from the impression, rigidifying the positive by filling the positive with a molten, low-melting point wax composition and allowing the composition to harden in the positive, coating the resulting rigid model by spraying the same exteriorly except for the opening in the model with finely divided metal, thereby duplicating interiorly of the coating all detailed surface characteristics of the model, while leaving uncoated a portion of the wax composition corresponding to the opening in the flexible model and leaving a corresponding opening in the coating, melting the wax composition, flowing through the opening in the coating the resulting molten wax out of the resulting coated model, collapsing the model away from the coating, and withdrawing the collapsed model from the coating through the opening therein, thereby leaving the coating as a hollow, open mold adapted to receive moldable material therein and duplicating on its interior surfaces the surface characteristics of the positive model and therefore of the original object to be duplicated by molding the moldable material in the hollow open mold.

CLARE L. MILTON, JR.
CARL A. NIELSON.

REFERENCES CITED

The following references are of record in the file of this patent:

UNITED STATES PATENTS

| Number | Name | Date |
| --- | --- | --- |
| 1,179,762 | Schoop | Apr. 18, 1916 |
| 1,813,880 | Kraft | July 7, 1931 |
| 1,856,394 | Lettermann | May 3, 1932 |
| 2,280,074 | Halsall | Apr. 21, 1942 |
| 2,345,977 | Howald et al. | Apr. 4, 1944 |